United States Patent [19]
Joray

[11] Patent Number: 6,000,205
[45] Date of Patent: Dec. 14, 1999

[54] FLAIL-TYPE VEGETATION CUTTER

[75] Inventor: Marvin L. Joray, Union Grove, Wis.

[73] Assignee: Textron Inc., Providence, R.I.

[21] Appl. No.: 09/013,232

[22] Filed: Jan. 26, 1998

[51] Int. Cl.[6] .................................................. A01D 49/00
[52] U.S. Cl. ............................................. 56/294; 241/194
[58] Field of Search ........................... 56/12.7, 294, 504, 56/295; 171/58; 241/194, 605, 101.76, 101.78

[56] References Cited

U.S. PATENT DOCUMENTS

| | | | |
|---|---|---|---|
| 3,177,640 | 4/1965 | Mott, Jr. | 56/294 |
| 3,222,854 | 12/1965 | Barth | 56/294 |
| 3,400,527 | 9/1968 | Woodring | 56/294 |
| 3,452,823 | 7/1969 | Shapland | 172/42 |
| 3,465,507 | 9/1969 | Fishaw | 56/294 |
| 3,505,800 | 4/1970 | McCanse | 56/294 |
| 3,527,038 | 9/1970 | Wood | 56/294 |
| 3,608,842 | 9/1971 | Engler | 241/194 |
| 3,678,671 | 7/1972 | Scarnato et al. | 56/12.7 |
| 4,172,481 | 10/1979 | Brisson | 144/208 |
| 4,572,258 | 2/1986 | Mischel | 144/208 |
| 4,690,187 | 9/1987 | Schmidt | 144/340 |

*Primary Examiner*—Thomas B. Will
*Assistant Examiner*—Robert Pezzuto
*Attorney, Agent, or Firm*—Arthur J. Hansmann

[57] ABSTRACT

A flail-type vegetation cutter having a drum and members attached and extending longitudinally of the drum. Rods extend along the members which have openings, and shackles are pivotally mounted on the rods and extend through the openings and are confined in the openings. Flail blades are pivotally connected to the shackles and are spaced along and around the circumference of the drum.

14 Claims, 4 Drawing Sheets

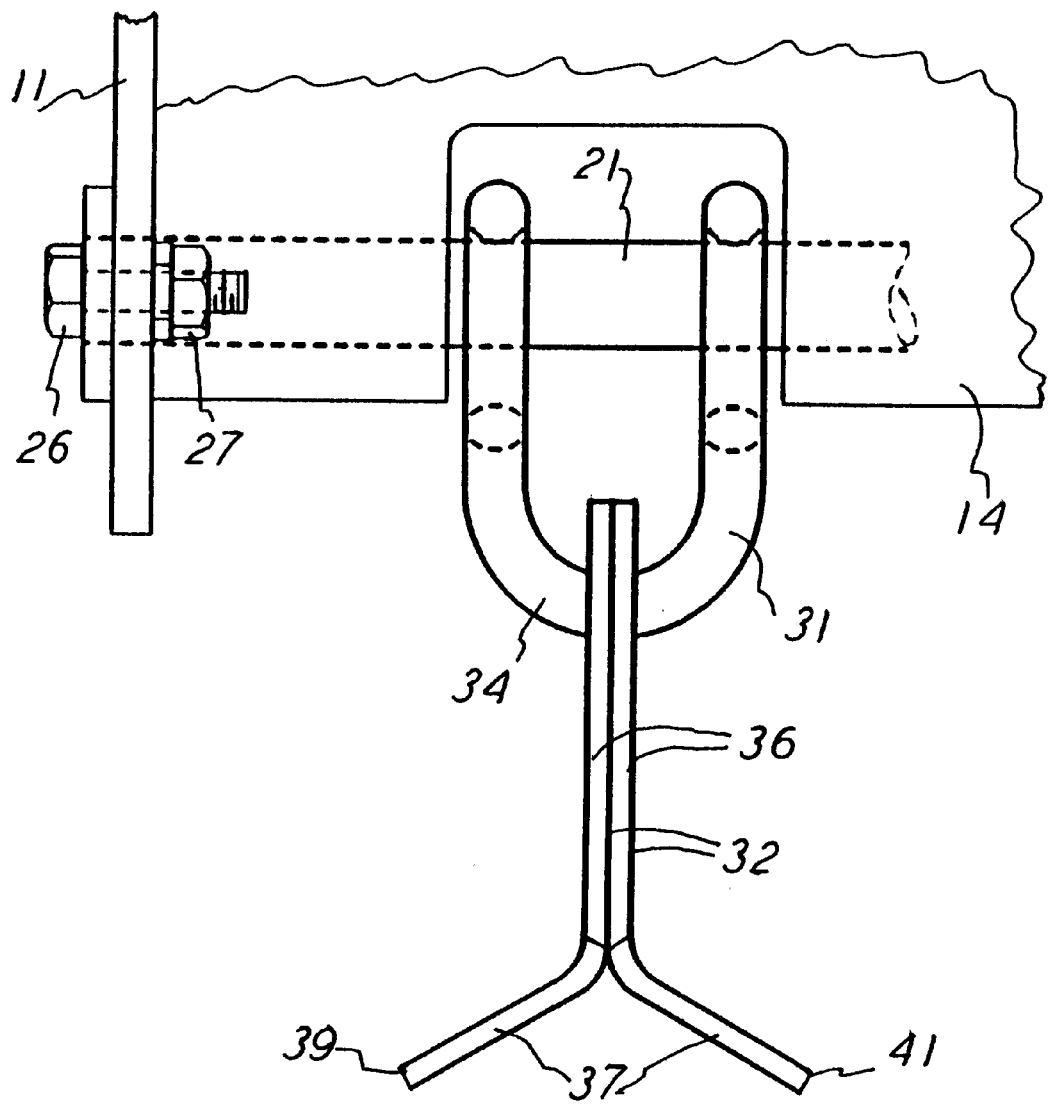
F I G. 4

FLAIL-TYPE VEGETATION CUTTER

This invention relates to a flail-type vegetation cutter, and, more particularly, it relates to a power cutter which has flails suspended from a rotor for cutting grass or the like.

BACKGROUND OF THE INVENTION

Flail-type rotors are already well-known in the art. Those prior art flail-type cutters include a mobile ground vehicle which supports and transports a rotating drum on a horizontal axis for movement over the grass or other vegetation to be cut. The drum has flails articularly mounted thereon for engaging the vegetation and cutting same when the drum is rotated.

Commonly, the prior art flail-type cutters have chain links for attaching the cutter to the rotating drum, and the links are spaced around and along the drum to be staggered such that upon rotation, different flails engage different swathes of vegetation. As mentioned, the prior art flails commonly use a plurality of chain links or the like for attaching the flail to the drum. Further, the aforesaid attachment is such that the entire assembly is not made optimumly strong, and the drum is exposed to damage by the rotating flail, or other debris, and also the momentum of the flail can tend to damage the rotor itself.

Accordingly, the objects of this invention are to improve upon the aforesaid prior art and to do so with an assembly of a rotating drum with flails spaced therearound such that the assembly is not overly subjected to damage and is not self-destructive, and, which in fact is structurally reinforced by the members which are assembled in the final machine. In that assembly, there is only a minimum of parts which achieve the required structural strength and which produce full and complete swath cutting in one pass over the ground.

In the final assembly of the several parts constituting the flail rotor, the arrangement is such that there is an optimum structural strength in the rotor tube by increasing its section modulus. In that manner, the tube can be of a larger diameter but actually of a thinner wall material, and it can therefore greatly reduce the weight otherwise required such as in the prior art rotors.

Still further, the present invention provides a flail-type assembly wherein the individual flails can be readily removed and replaced, and they can also be reversed to present a different cutting edge, all without requiring that the flails be sharpened each time they are removed, but, instead, they can simply be reversed in their mounting. Further, the mounting of the cutter itself as a part of the flail members is such that the cutter can be individually removed from the rest of the flail although the cutters are completely secure as a part of the flail for the operation of the rotation of the drum in the vegetation cutting procedure.

In summary, the flail assembly of this invention is arranged so that the assembly is light in weight and has only a minimum number of parts but is completely sturdy and durable for cutting vegetation, and the cutters themselves can be readily reversed for double cutting edge presentation and for complete replacement of a cutter, as desired.

BRIEF DESCRIPTION OF THE DRAWINGS

FIG. 4 is a fragmentary right side view of FIG. 3.

FIG. 5 is a side elevational view of a flail and a shackle, as seen in the previous views.

DETAILED DESCRIPTION OF THE PREFERRED EMBODIMENT

Figure 1:
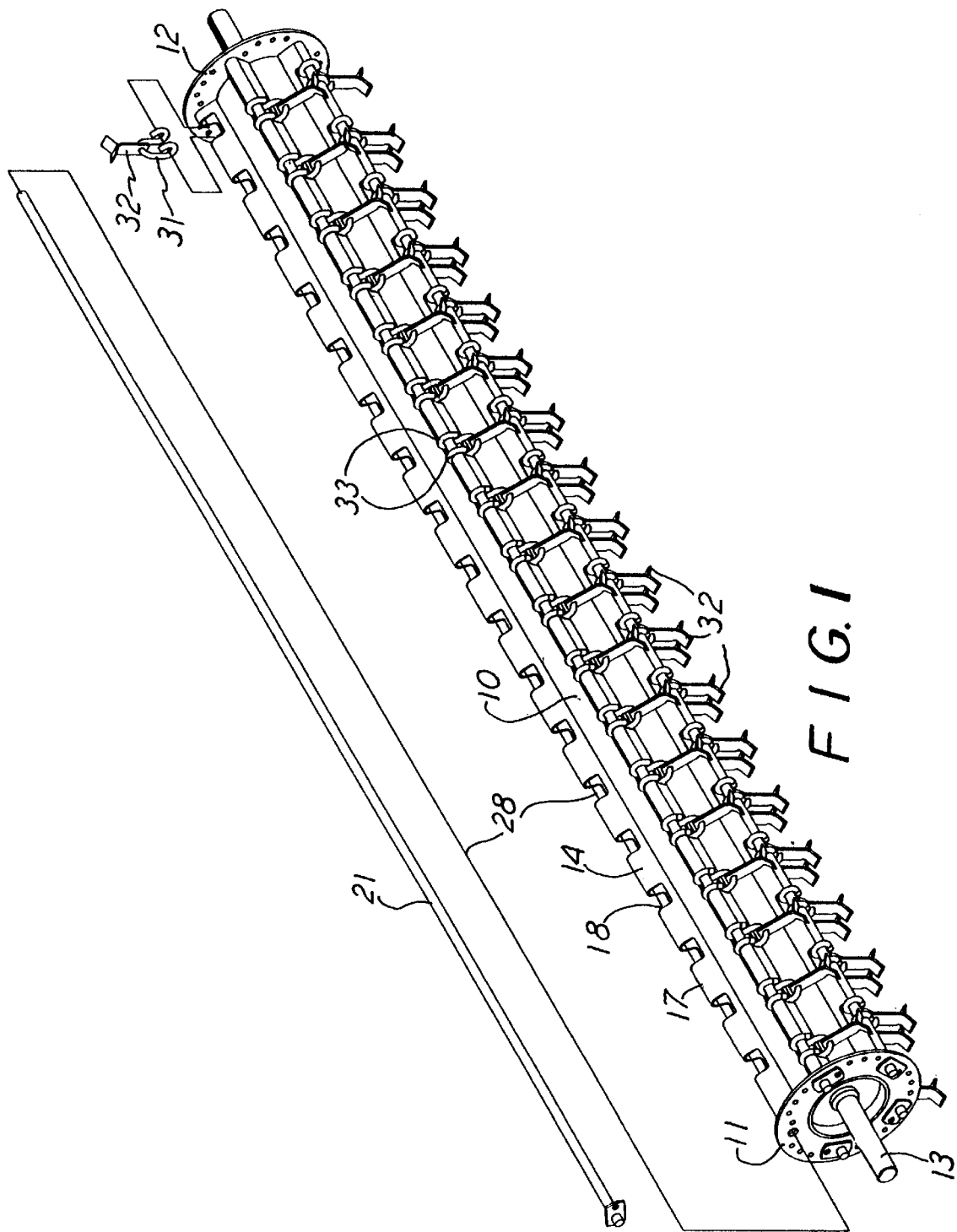
FIG. 1 is a perspective view of a flail drum assembly of this invention and showing a part thereof in an exploded display.

FIG. 1 shows an assembly of parts of this invention, including a central drum 10 which is a hollow or tubular member and which extends from a left circular plate 11 to a right circular plate 12 and the drum and plates are suitably connected together. A shaft 13 extends axially through the drum 10 and beyond both plates 11 and 12 and is thus available for suitable mounting in a machine to be transported over the ground for purposes of the flail action in the rotation of the drum 10, as more clearly shown hereinafter. Of course the shaft 13 has a longitudinal axis extending throughout its length from end to end, and the drum 10 is coaxially disposed therewith. A plurality, such as five or so, V-shaped members 14 are disposed and arranged to extend for the length of the drum 10 and in positions spaced around the outer circumference of the drum 10 and they are suitably affixed to the circumference, such as by welding or the like.

With the plurality of the V-shaped members 14 spaced around the circumference of the drum 10, and being physically attached therewith, the drum 10 is reinforced and can therefore be of a lighter material than otherwise required. Also, the members 14 can be welded at their opposite ends to the adjacent plates 11 and 12, and thereby give connection and support relative to the drum 10 without being directly welded thereto.

Figure 2:
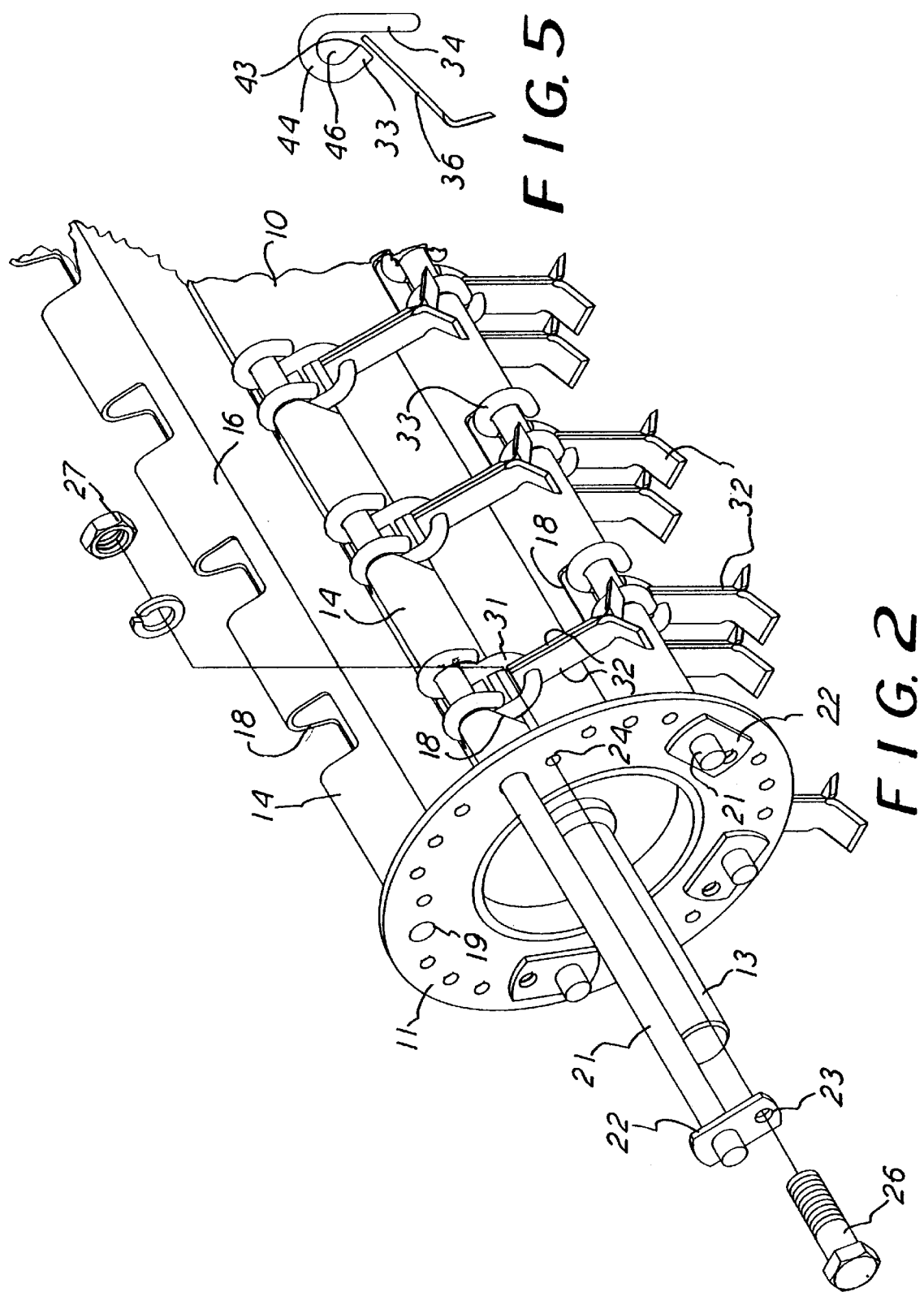
FIG. 2 is an enlarged view of the left end portion of FIG. 1 and with parts thereof shown in their non-final assembled position.
Figure 3:
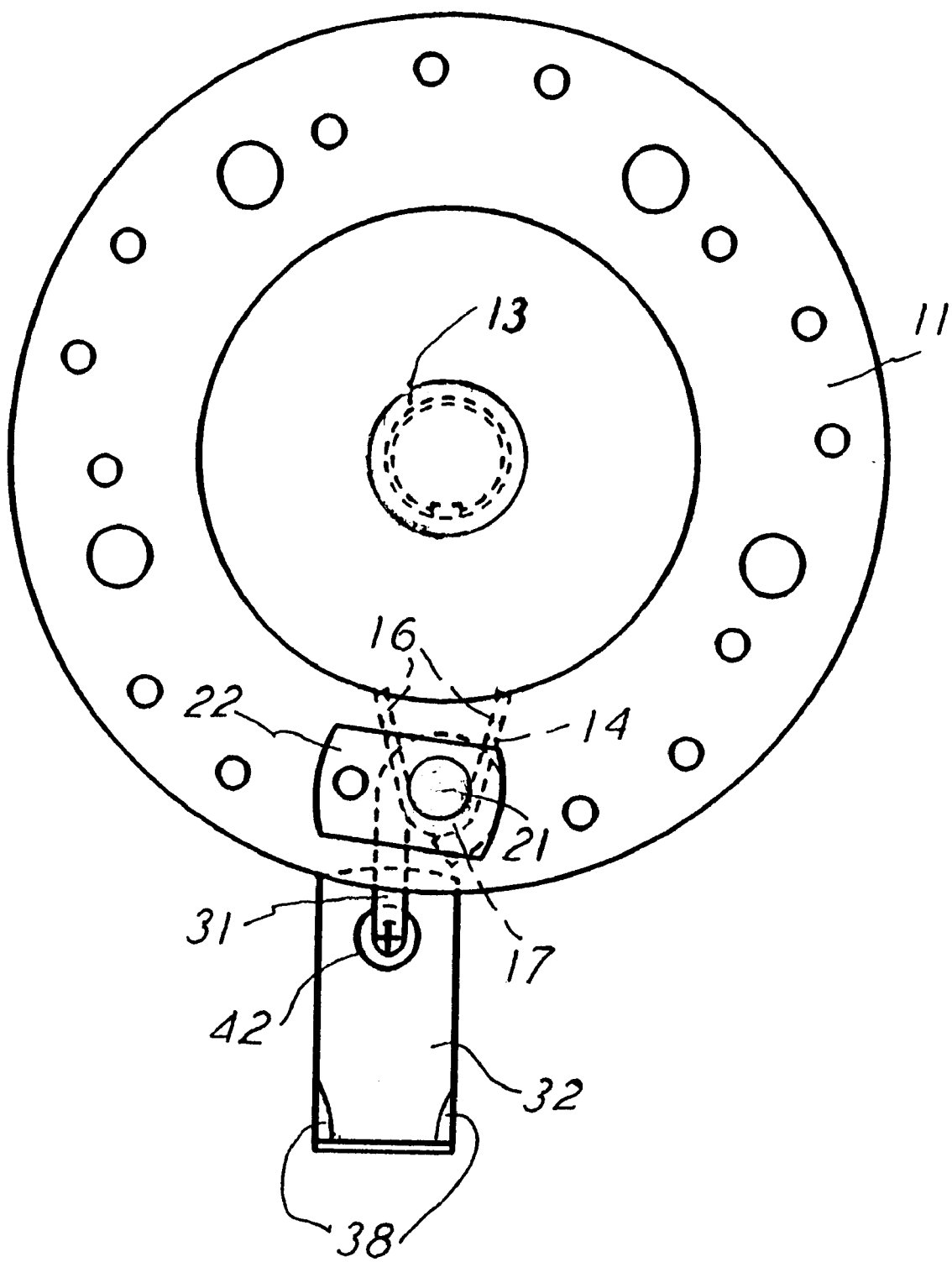
FIG. 3 is a slightly enlarged left end elevational view of a portion of FIG. 1.

As best seen in FIGS. 2 and 3, the members 14 have the V-shape mentioned and terminate in spaced-apart legs 16 which are on the circumference of the drum 10 and they also have the apexes 17, thus they form the V-shape, as seen in FIG. 3, for instance. The members 14 also have slots 18 spaced therealong, and the slots 18 are in staggered relationship from one member 14 to the other members 14, such as best seen in FIG. 2 with the two uppermost members 14. This is for a reason of staggering the flail sub-assemblies which will be described later, and thereby a full drum cutting swath is achieved upon rotation of the drum 10. FIG. 2 also shows that the slots or openings 18 are rectangular when viewed directly from above, and the members 14 have two spaced-apart edges entirely disposed on respective two spaced-apart planes perpendicular to the drum longitudinal axis to define two of the opposite end limits of the rectangular shape.

End plates 11 and 12 have holes 19 therein and aligned with each other from end to end of the drum assembly, and a solid rod 21 extends through the two aligned openings 19 in their respective end plates 11 and 12, and the rod 21 is shown in the partial disassembled position in FIG. 2. A plate 22 is suitably affixed to one end of each rod 21, and the plate 22 extends offset from the longitudinal axis of the rod 21 and has an opening 23 which aligns with an opening 24 in the plate 11. Finally, a bolt 26, with attached nut 27 extends through the openings 23 and 24 to secure the plate 22 and thus the rod 21 in its extent between the end plates 11 and 12. At the point of the plate 12, the rod 21 simply extends through the unshown opening in end plate 12. With that arrangement, the rods 21 are attached relative to the drum 10 and the plates 11 and 12 at circumferential spacing around the assembly and actually to have a rod 21 extend through each V-shaped member 14 for the full length of the assembly as shown. It will therefore be understood that the assembly and disassembly relative to the rods 21 is made simply by releasing the bolt 26 and withdrawing the rod 21 from the members 14. FIG. 1 shows one of the rods 21 in its disassembled position, and the line designated 28 indicates the assembled relationship with the members 14 and the end plates 11 and 12 for that particular rod 21, as with all of the other rods 21 also.

At each opening 18 for each of the members 14, there is a sub-assembly of a U-shaped shackle 31 and a pair of J-shaped flails 32. Each shackle 31 has two spaced-apart curved ends 33 which present a central opening therethrough, or an eyelet, and thus each shackle 31 can be mounted on a rod 21, as shown. The shackles 31 have their ends 33 spaced apart at approximately the longitudinal extent of each opening 18, that is, between the two opposite edges mentioned, and thus the shackles 31 are restrained by the members 14 while extending through the openings 18. Of course the shackles 31 are also restrained radially by the rod 21 on which they are mounted. See FIG. 4.

Each shackle 31 also has an intermediate and U-shaped extent 34 and the plane in which the U-shape 34 is disposed lies parallel to the longitudinal axis of the drum 10 and thus also of the longitudinal axis of the mounting rod 21.

Each shackle 31 has two flail blades 32 mounted thereon. The blades 32 include the shank flat portions 36 and the offset toe or cutting portions 37 which are sharpened on both opposite sides, such as indicated in FIG. 3 by the sharpened edges designated 38. Therefore, the flails 32 can be reversed in their mounting on the respective shackle 31 and, depending upon the direction rotation of the drum 10, a selected cutting edge 38 can be presented to the vegetation that is to be cut, and, as mentioned, the flails 32 can be removed for presenting the other cutting edge 38 to the vegetation without altering the direction of rotation of the drum 10.

The flails 32 are thus in a hockey-stick silhouette, and they have approximately 135 degrees between the shank 36 and the toe portion 37, as best seen in FIG. 4. Of course every two flails 32 on each shackle 31 cover a cutting swath from the flail tip 39 to the flail tip 41 on the adjacent flail 32. Further, as mentioned above, the staggering of the shackle and flail assemblies on the drum 10 is such that a complete swath of uninterrupted cut is achieved between the plates 11 and 12 upon rotation of the drum 10.

With the arrangement shown and described, the flails 32 cannot impact upon the drum 10, and thus the assembly is not self-destructive. Nevertheless, the assembly is simply achieved by threading the rods 21 through the shackle eyelets 33 for swingably mounting the flails 32 relative to the drum 10. The entire assembly can then be suitably supported on an unshown tractor and moved over the vegetation for cutting same, and that can be as disclosed in U.S. Pat. No. 3,505,800, by way of incorporated example.

In addition to the simplicity of having only a two-piece flail-type sub-assembly, namely, the shackle 31 and the flail 36, there is also the feature of the ready and easy replacement of each flail 36 on its shackle 31. To accomplish that, each flail 36 has an opening 42 near one end thereof, and the opening is of course of a size larger than the cross section of the rod type of material forming the shackle 31, as shown. Also, as seen in FIG. 5, the shackle eyelet 33 and its U-shaped portion 34 have a space 43 therebetween, and that space is greater than the thickness of the shackle shank 36. The entire arrangement is such that the flail shank 36 can be slipped through the shackle opening 43 and then the flail 32 can be positioned on the shackle substantially completely circular portions 44 which define the shackle eyelet opening 46. Each flail 32 would be individually positioned on the respective shackle 31, and it is secure thereon in that the rod 21 also occupies the eyelet 46 and precludes the flail 32 from being removed from the shackle 31 while the rod 21 is in the assembled position. Of course the rod 21 may be withdrawn only to the extent necessary to remove the sub-assemblies of the shackles 31 and flails 32, as desired or necessary. In this arrangement, the assembly requires only that there be a shackle 31 and the flail 32, and there are no additional parts required for that portion of the assembly for this invention. For this purpose and claiming herein, the two flails are to be considered one, so there are only two pieces for flail action, namely, the shackle and the flail without any intervening piece. As such, the assembly is simplified and is less susceptable to self destruct upon flail action.

What is claimed is:

1. A flail assembly for use in cutting vegetation, comprising:

a rotatably mounted drum having a longitudinal axis of rotation and a continuous external circumferential surface, an end plate affixed to each opposite longitudinal end of said drum and extending radially beyond said drum circumferential surface and being welded to said drum to form a rotor therewith, a plurality of members extending the length of said drum and being V-shaped in their cross-sections transverse to their longitudinal extents and thereby presenting two free ends and an apex intermediate said free ends and with oppositely disposed longitudinal ends of said members being welded to the respective one of said end plates to be affixed to said rotor and with said two free ends being on said circumferential surface for structural support, said members having slots therein with lengths extending along said apexes, a plurality of solid rods releasably attached to one of said end plates and extending to the other of said plates and thereby being arranged to be removably mounted on said rotor and respectively extending in each of said members along said longitudinal extent and at said apexes of said members to have radially outward support on said members, and thereby be enclosed by said members, a plurality of shackles, each being of a single piece of solid circular cross-section material, surrounding said rod so as to be trapped and pivotal thereon and with each of said shackles having two circularly extending leg portions spaced apart for substantially said length of each of said slots and with each two of said leg portions being disposed in each respective one of said slots and occupying the full length said slot to thereby be restricted in movement along said rod to only substantially the length of said slot and with said leg portions being respectively disposed to extend through each of said slots and with each of said shackles including a loop portion disposed to extend radially away from said drum, and a flail blade directly pivotally mounted on each said loop portion to orbit said drum in response to the rotation of said drum and thereby cut vegetation, whereby each said shackle and each said flail blade constitutes a complete two-piece sub-assembly which is pivotally attached directly to said rods.

2. The flail assembly as claimed in claim 1, wherein said rod is by itself releasably attached to said rotor and is singly removable from said rotor for removing said sub-assembly of said shackle and said flail blade as desired.

3. The flail assembly as claimed in claim 1, wherein each said shackle has an eyelet with the axis thereof being parallel to said longitudinal axis for receiving said rod and said loop portion is disposed to extend from said eyelet and is curved along a plane extending along the axis of said eyelet.

4. The flail assembly as claimed in claim 3, wherein each said flail blade is J-shaped and includes a cutting edge at the offset portion of said J-shape, and each said flail blade has an enclosed opening pivotally receiving the respective one of said loop portions.

5. The flail assembly as claimed in claim 1, wherein said shackle is U-shaped and has an eyelet at each upper end of the U-shape for receiving said rod and has a loop portion at the curve of said U-shape for receiving said flail blade.

6. The flail assembly as claimed in claim 5, wherein each said flail blade is J-shaped and includes a cutting edge at the lower and offset portion of said J-shape, and each said flail blade has an enclosed opening for respectively receiving the respective one of said loop portions.

7. The flail assembly as claimed in claim 1, wherein each said shackle has an eyelet surrounding said rod, each said flail blade has a completely surrounded opening for receiving said shackle for mounting said flail blade on said shackle, and the portion of said shackle adjacent said eyelet has a passageway for movement of said flail blade onto and off said shackle.

8. The flail assembly as claimed in claim 7, including two said flail blades being mounted on each one of said shackles and with each of said flail blades having a vegetation cutting edge extending away from each other in the direction substantially parallel to said longitudinal axis.

9. The flail assembly as claimed in claim 8, wherein each of said flail blades has two said cutting edges arranged on opposite sides of each of said flail blades and with said flail blades being reversibly mountable on said shackles for presenting either one of said two cutting edges for cutting action.

10. The flail assembly as claimed in claim 1, wherein said slots on said members are disposed to be in a staggered pattern around said circumference of said drum and to thereby be in a spaced-apart pattern along the length of said drum, and said flail blades having vegetation cutting portions extending in the direction substantially parallel to said longitudinal axis and with said cutting portions being located and arranged to overlap each other, and thereby effect complete cutting for the entire length of said drum, in response to said blades being mounted relative to said slots and upon rotation of said drum.

11. A flail assembly for use in cutting vegetation, comprising:

a rotatably mounted base member, a plurality of elongated rods of solid rod material removably attached relative to said base member and each of said rods extending beyond the length of said member and having a longitudinal axis, a sub-assembly consisting of only two pieces consisting of a shackle and a flail and with said shackles each having two leg portions space apart along said axis and presenting a circular opening therein with a central axis disposed co-axially with said longitudinal axis and with said rods respectively extending through said openings and with said shackles being swingably mounted directly on said rods and there being a plurality of said sub-assemblies mounted on said rods and spaced therealong, and a plurality of members attached relative to said base member and extending to said rods and being disposed to cover over said rods and thereby enclose said rods and with said members having having slots spaced therealong and with said leg portions extending through said slots and with each of said slots being of a length only slightly greater than the spacing of said leg portions and thereby being arranged to restrict movement of said sub-assemblies along said rods.

12. The flail assembly for use in cutting vegetation, as claimed in claim 11, wherein each of said shackles is of a single piece of material arranged to surround and being directly mounted on said rod so as to be trapped and pivotal thereon and with each of said shackles including a loop portion disposed to extend radially away from said base member, and said flail being directly pivotally mounted on each said loop portion to orbit said base member in response to the rotation of said base member.

13. The flail assembly for use in cutting vegetation as claimed in claim 12, wherein each of said shackles includes two spaced-apart eyelet portions for slidably mounting said shackles on said rods.

14. In a flail-type vegetation cutter assembly which includes a rotatably mounted drum having a longitudinal axis, two end plates respectively affixed to the two axial ends of said drum, a plurality of members affixed to said drum and spaced therearound and extending therealong for the length of said drum and forming an hollow elongated enclosure with said drum and having elongated openings spaced along said members, a cylindrical member disposed within each of said enclosures and extending between and removably attached to said end plates, and a sub-assembly of a plurality of flail members linked together and pivotally anchored on respective ones of said cylindrical members and extending therefrom and through said respective openings, the improvement comprising said cylindrical members being solid rods with each thereof having a continuous and uniform dimensioned outer surface throughout its length, each of said openings in said members being only of a rectangular shape which is partly formed by said members having two straight edges respectively spaced apart on two spaced apart planes which are perpendicular to said longitudinal axis, and each of said sub-assemblies consists of only two parts, namely, a shackle and a cutting blade, which are linked together and with the shackle being of bent rod material formed to include two eyelets pivotally mounted on and encircling a respective one of said solid rods and projecting through respective said openings and past said straight edges and with said eyelets being spaced apart substantially the distance of the spacing between every said two straight edges to thereby be movably restricted by said two straight edges along the longitudinal axes of said rods and to be limited in pivoting action by the dimensional limits of said rectangular openings.

* * * * *